United States Patent [19]
Ogawa et al.

[11] Patent Number: 5,868,818
[45] Date of Patent: Feb. 9, 1999

[54] ADSORBENT FOR AIR SEPARATION, PRODUCTION METHOD THEREOF, AND AIR-SEPARATION METHOD USING IT

[75] Inventors: Nobuhiro Ogawa, Chiba; Shigeru Hirano; Keiji Itabashi, both of Yamaguchi, all of Japan

[73] Assignee: Tosoh Corporation, Yamaguchi, Japan

[21] Appl. No.: 864,987

[22] Filed: May 29, 1997

[30] Foreign Application Priority Data

Aug. 8, 1996 [JP] Japan .................................. 8-209852
Dec. 6, 1996 [JP] Japan .................................. 8-326646

[51] Int. Cl.[6] .................................................. B01D 53/047
[52] U.S. Cl. .................................. 95/96; 95/130; 95/902; 423/716; 423/328.2; 423/331; 423/332; 502/79
[58] Field of Search ................................ 95/96, 130, 902; 502/79, 85; 423/328.1, 328.2, 331, 332, 700, 716

[56] References Cited

U.S. PATENT DOCUMENTS

| | | | |
|---|---|---|---|
| 2,835,343 | 5/1958 | Wolff et al. ................................ | 95/130 |
| 3,140,933 | 7/1964 | McKee ........................................ | 55/68 |
| 4,481,018 | 11/1984 | Coe et al. ................................ | 95/130 |
| 4,544,378 | 10/1985 | Coe et al. ................................ | 95/130 |
| 4,859,217 | 8/1989 | Chao ........................................... | 55/68 |
| 5,152,813 | 10/1992 | Coe et al. .................................... | 55/26 |
| 5,174,979 | 12/1992 | Chao et al. ............................... | 423/715 |
| 5,258,058 | 11/1993 | Coe et al. ............................... | 95/130 X |
| 5,268,023 | 12/1993 | Kirner ........................................ | 95/103 |
| 5,441,557 | 8/1995 | Mullhaupt et al. .................... | 95/130 X |
| 5,464,467 | 11/1995 | Fitch et al. ............................. | 95/130 X |
| 5,562,756 | 10/1996 | Coe et al. .............................. | 95/130 X |
| 5,584,912 | 12/1996 | Li et al. ................................. | 95/130 X |
| 5,616,170 | 4/1997 | Ojo et al. ............................... | 95/130 X |
| 5,658,370 | 8/1997 | Vigor et al. ........................... | 95/130 X |
| 5,672,195 | 9/1997 | Moreau et al. ........................ | 95/130 X |
| 5,674,311 | 10/1997 | Notaro et al. ......................... | 95/130 X |

FOREIGN PATENT DOCUMENTS 5-25527  4/1993  Japan .

*Primary Examiner*—Robert Spitzer
*Attorney, Agent, or Firm*—Sughrue, Mion, Zinn, Macpeak & Seas, PLLC

[57] ABSTRACT

A crystalline zeolite X adsorbent comprising a crystalline zeolite X having an $SiO_2/A_2O_3$ molar ratio of not larger than 3.0, where lithium cations associated with an $AlO_2$ tetrahedron unit are 80 to less than 88 mol % of the total cations and the content of alkaline earth metal cations is from 0.5 to less than 4.6 mo % is produced by ion-exchanging with lithium cations at least 90 mol % of the cations associated with an $Al_2O_3$ tetrahedron unit of a crystalline zeolite X having an $SiO_2/Al_2O_3$ molar ratio of not larger than 3.0, ion-exchanging the crystalline zeolite X again with an aqueous solution of mixed salts of an alkali metal salt and an alkaline earth metal salt to decrease the lithium cations associated with the $AlO_2$ tetrahedron unit to 80 to less than 88 mol %, followed by washing and drying, and activating the crystalline zeolite X. The crystalline zeolite X adsorbent is used for the recovery of oxygen from air by a pressure swing adsorption method by using the crystalline zeolite adsorbent.

5 Claims, 12 Drawing Sheets

ADSORBENT FOR AIR SEPARATION, PRODUCTION METHOD THEREOF, AND AIR-SEPARATION METHOD USING IT

FIELD OF THE INVENTION

The present invention relates to an adsorbent used for separating and recovering oxygen from air by a pressure swing adsorption (hereinafter referred to as "PSA"), a production method of the adsorbent, and an air separation method using it.

Oxygen gas is one of most important gases in industrial gases and is widely used for iron manufacture, pulp bleaching, etc.

Recently, in the fields of incineration of rubbish, glass melting, etc., an oxygen-enriched combustion has begun to be employed for the purpose of reducing the generation of $NO_x$, and also from the standpoint of a environmental protection, the importance of an oxygen gas has been more and more increased.

The production method of oxygen gas includes a PSA separation method, a membrane separation method, a low-temperature separation method, etc., but recently, the use of the PSA method capable of obtaining a high concentration oxygen gas at a low cost has been increased every year.

BACKGROUND OF THE INVENTION

For oxygen gas production by the PSA method, zeolite adsorbents selectively adsorbing a nitrogen gas are used and, until now, an adsorbent comprising a crystalline zeolite X or A which is ion-exchanged mainly with a calcium cation has been used.

On the other hand, it is known that a crystalline zeolite X which is ion-exchanged with a lithium cation is excellent in the separation characteristics of air as disclosed in U.S. Pat. No. 3,140,933, and recently the adsorbent comprising the lithium-exchanged crystalline zeolite X has increased.

U.S. Pat. No. 3,140,933 shows that the performance of the crystalline zeolite X is higher as the lithium-exchange ratio increases, and this fact has been re-confirmed in JP-B-5-25527 (the term "JP-B" as used herein means an 'examined published Japanese patent application) and U.S. Pat. No. 5,268,023.

The lithium-exchanged crystalline zeolite X is obtained by ion-exchanging a crystalline zeolite X using an aqueous solution containing a lithium salt. However, because lithium, which is a scarce metal, is expensive, the crystalline zeolite X adsorbent having a high lithium-exchange ratio is a very expensive adsorbent.

On the other hand, mixed cation-exchanged zeolite X adsorbents, wherein the ratio of the expensive lithium cations is reduced by mixing 5 mol % or more, substantially from 15 to 30 mol %, of alkaline earth metal cations with the lithium cations, are proposed as described in U.S. Pat. Nos. 5,174,979 and 5,152,813.

However, in the crystalline zeolite X containing 5 mol % or more of an alkaline earth metal cation, the adsorbing amount of nitrogen is large but the co-adsorption of oxygen is also large, which results in decreasing the selective adsorption property of nitrogen, whereby the performance of such a crystalline zeolite X as an adsorbent for air separation is insufficient.

Despite the fact that the crystalline zeolite X adsorbent which is ion-exchanged with lithium cations has excellent nitrogen selective adsorption characteristics, in the crystalline zeolite X adsorbent having a high lithium-exchange ratio, the cost of the adsorbent and the cost of the oxygen gas produced using such an adsorbent are very expensive.

Thus, it has been strongly desired to develop an adsorbent excellent in the cost performance that a content of expensive lithium is minimized as low as possible and which has an excellent nitrogen selective adsorption property.

SUMMARY OF THE INVENTION

Accordingly, one object of the present invention is to provide such a novel crystalline zeolite X adsorbent satisfying the above-described requirements.

Another object of the present invention is to provide a production method of the crystalline zeolite X adsorbent.

A further object of the present invention is to provide an air separation method by a pressure swing adsorption using the crystalline zeolite X adsorbent.

As a result of various investigations on a crystalline zeolite X adsorbent ion-exchanged with lithium cations, it has been found that even when the ion-exchanged content of lithium cations of a crystalline zeolite X is less than 88 mol %, a high air-separation performance is obtained by adding thereto less than 4.6 mol % of alkaline earth metal cations, and in particular, after ion-exchanging the crystalline zeolite X until the lithium cations are at least 90 mol % as association ratio of an $AlO_2$ tetrahedron unit to thereby introduce the lithium cations to the site III, which is the ion-exchange site III playing an important role for the adsorption of nitrogen, the crystalline zeolite X is re-ion-exchanged with an aqueous solution of mixed salts containing alkali metal cations and alkaline earth metal cations as indispensable cations to remove the lithium cations of site I and the site II, which do not take part in nitrogen adsorbing effect, whereby a particularly excellent performance is obtained. The present invention has been accomplished based on this finding.

According to a first embodiment of the present invention, there is provided a crystalline zeolite X adsorbent comprising a crystalline zeolite X having an $SiO_2/Al_2O_3$ molar ratio of not larger than 3.0, wherein lithium cations associated with an $AlO_2$ tetrahedron unit are from 80 to less than 88 mol % of the total cations and the content of the alkaline earth metal cations is from 0.5 to less than 4.6 mol %.

According to a second embodiment of the present invention, there is provided a method of producing a crystalline zeolite X adsorbent, which comprises ion-exchanging with lithium cations at least 90 mol % of the cations associated with an $AlO_2$ tetrahedron unit of a crystalline zeolite X having an $SiO_2/Al_2O_3$ molar ratio of not larger than 3.0, ion-exchanging again the crystalline zeolite X with an aqueous solution of mixed salts of an alkali metal salt and an alkaline earth metal salt to decrease the lithium cations associated with the $AlO_2$ tetrahedron unit to 80 to less than 88 mol %, followed by washing and drying, and then activating the crystalline zeolite X.

According to a third embodiment of the present invention, there is provided an air-separation method by a pressure swing adsorption, which comprises selectively adsorbing nitrogen in air onto the crystalline zeolite adsorbent, and separating and recovering oxygen.

DETAILED DESCRIPTION OF THE INVENTION

Figure 1:
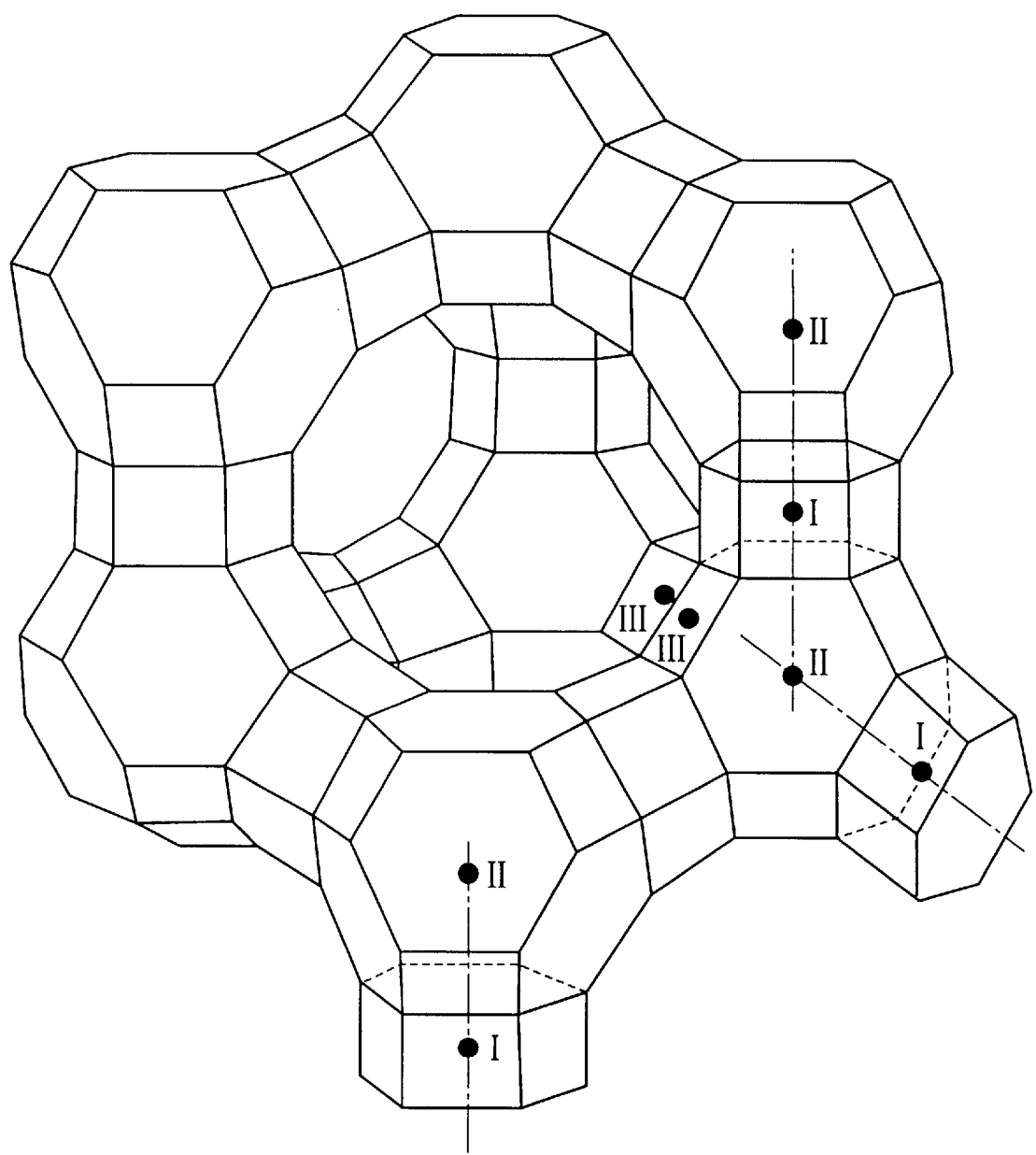
FIG. 1 is an enlarged schematic view showing the positions of 3 ion-exchange sites (called sites I, II, and III) in a crystalline zeolite X.
Figure 2:
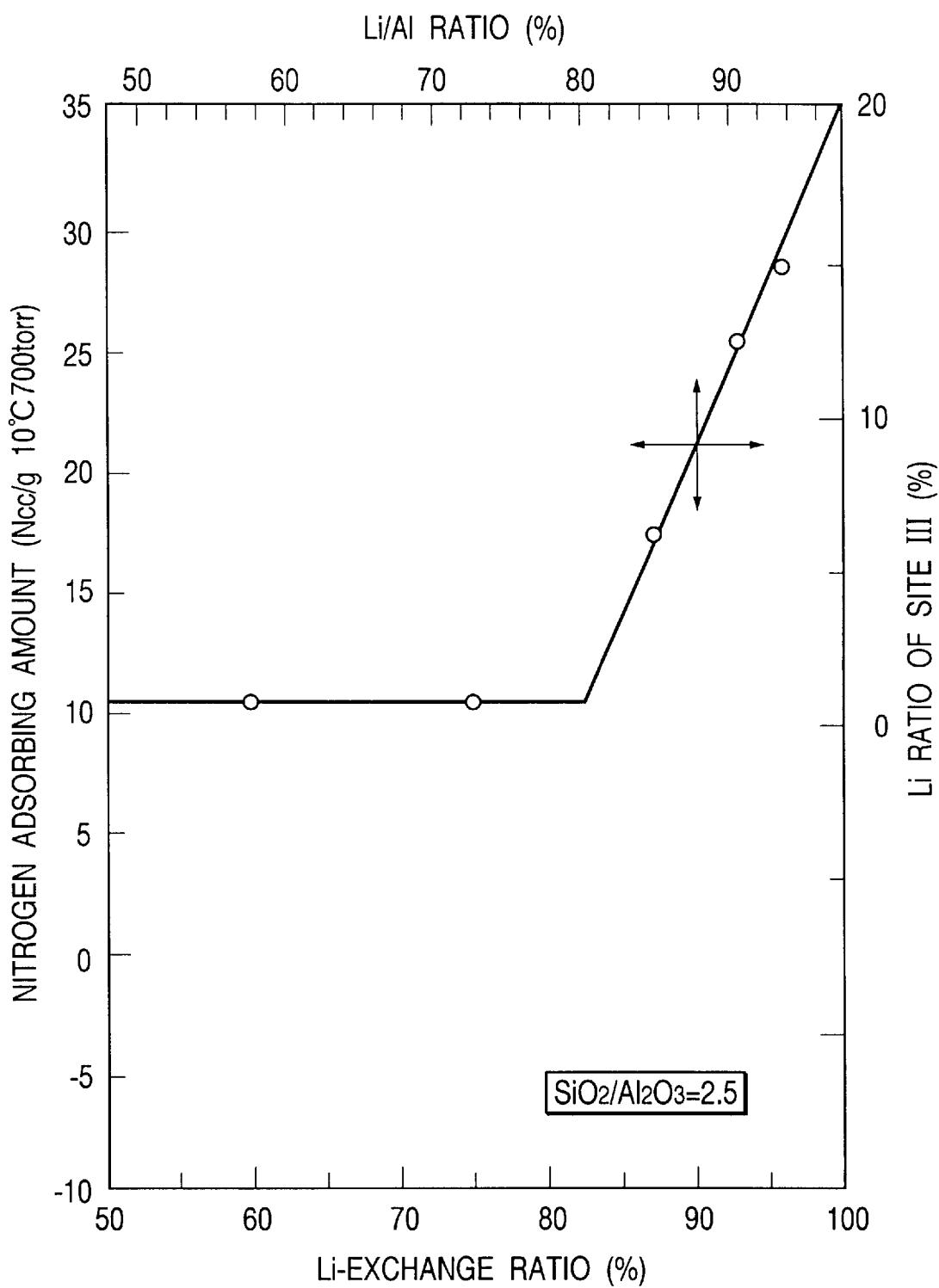
FIG. 2 is a graph showing the changes of the nitrogen adsorbing amount and the Li-exchange ratio of site III with the Li-exchange ratio when the $SiO_2/Al_2O_3$ is 2.5.
Figure 3:
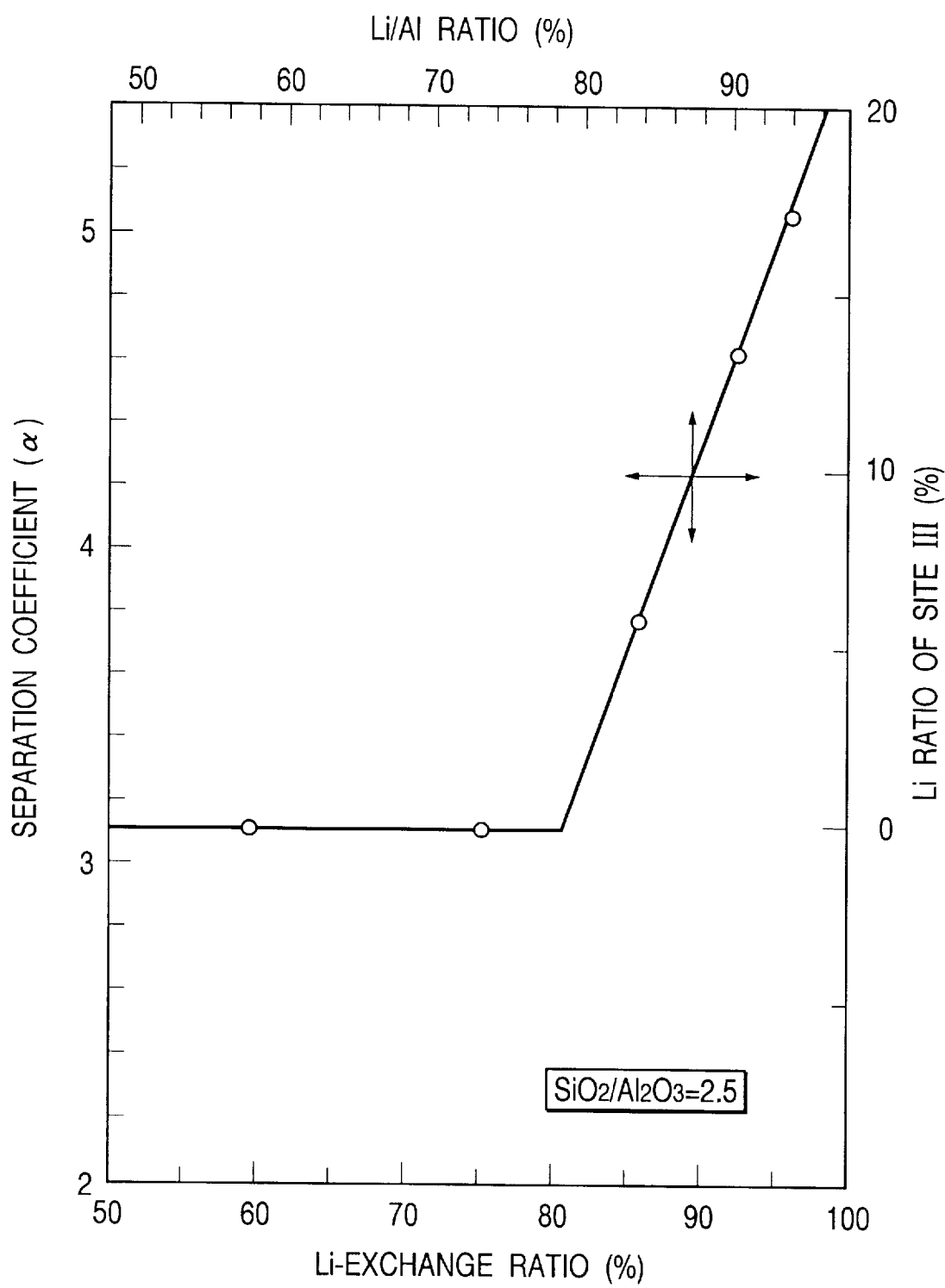
FIG. 3 is a graph showing the changes of the separation coefficient and the Li-exchange ratio of the site III with the Li-exchange ratio when the $SiO_2/Al_2O_3$ ratio is 2.5.
Figure 4:
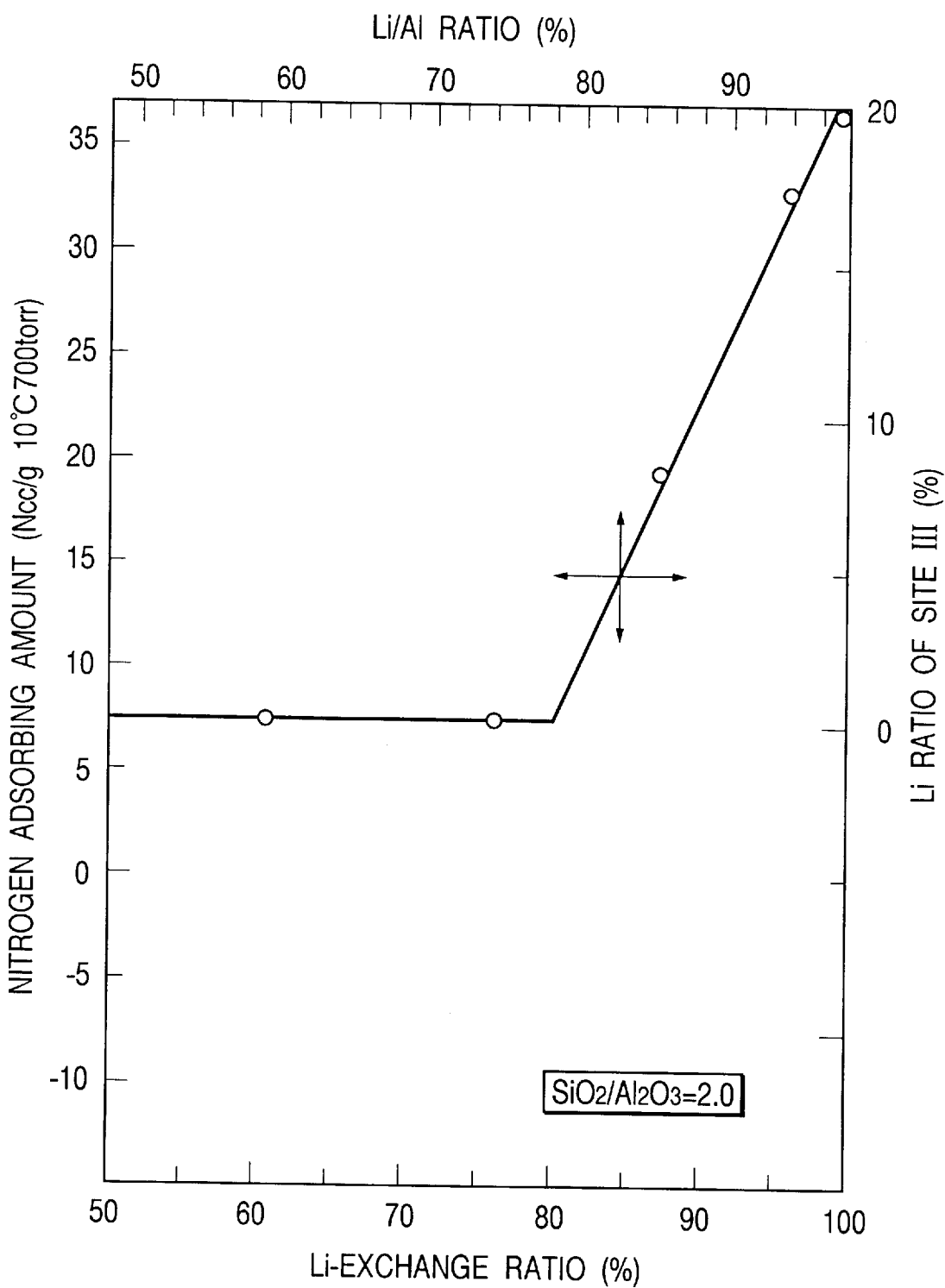
FIG. 4 is a graph showing the changes of the nitrogen adsorbing amount and the Li-exchange ratio of site III with the Li-exchange ratio when the $SiO_2/Al_2O_3$ ratio is 2.0.
Figure 5:
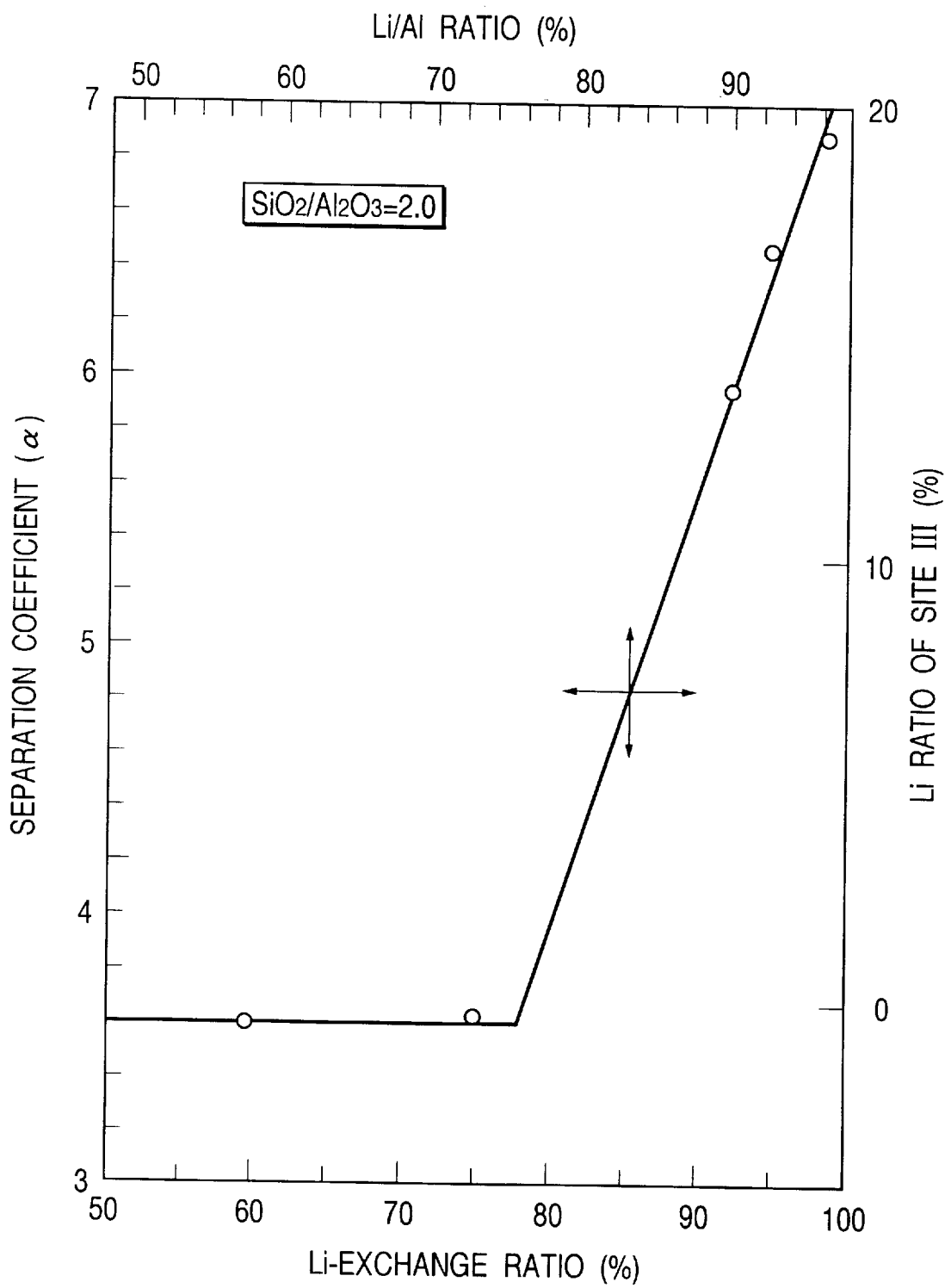
FIG. 5 is a graph showing the changes of the separation coefficient and the Li-exchange ratio of site III with the Li-exchange ratio when the $SiO_2/Al_2O_3$ ratio is 2.0.

The present invention is described in detail below.

A zeolite crystal of the adsorbent of the present invention is a crystalline zeolite X having an $SiO_2/Al_2O_3$ molar ratio of not larger than 3.0. In particular, the crystalline zeolite X having an $SiO_2/Al_2O_3$ molar ratio of from 1.8 to 2.5 is preferred.

The crystalline zeolite X is crystallographically classified into a faujasite type and is represented by the following chemical formula.

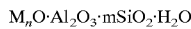

wherein m is 2 to 3 and M is a cation of a 2/n valence.

The reason that the zeolite seed of the adsorbent must be the crystalline zeolite X is explained below.

The adsorption of nitrogen and oxygen to a zeolite is a physical adsorption, and in particular, the electrostatic adsorption by the polarities (quadrupoles) of nitrogen and oxygen is the main adsorption driving force. Since nitrogen has a high quadrupole moment as compared with oxygen, if the adsorption to a zeolite is only by the electrostatic attraction, the nitrogen adsorption can obtain a high selectivity as compared with the oxygen adsorption, and a high value can be expected for the selectivity (herein expressed as a separation coefficient) which is defined as a relative volatility. On the other hand, nitrogen and oxygen are also adsorbed onto a zeolite by a dispersion force (intermolecular force). Since the adsorption by the dispersion force does not have a relationship with the polarity of an adsorbing molecule and does not provide a selectivity for the nitrogen adsorption and the oxygen adsorption, the separation coefficient approaches 1. Since the dispersion force is an interaction of a zeolite crystal and an adsorbing molecule, the influence of the dispersion force becomes larger and the selectivity of the nitrogen adsorption as the adsorption space in the zeolite becomes smaller, whereby the oxygen adsorption is decreased.

Accordingly, in order to increase the selectivity of the nitrogen adsorption, the adsorption space of the zeolite crystal must be large, and thus a crystalline zeolite X having large pores is the most suitable zeolite seed for an air separation.

On the other hand, it is known that a crystalline zeolite Y crystallographically belongs to the faujasite type the same as the crystalline zeolite X. However, because the crystalline zeolite Y has a peculiar property that a lithium cation cannot be exchanged to the ion-exchange site III which is important for the nitrogen adsorption, the crystalline zeolite Y cannot be used as the zeolite of the present invention.

The reason that the zeolite of the adsorbent of the present invention must be the crystalline zeolite X having a $SiO_2/Al_2O_3$ molar ratio of not larger than 3.0 is explained below.

If the $SiO_2/Al_2O_3$ molar ratio is larger than 3.0, the zeolite becomes the crystalline zeolite Y and the zeolite cannot be used in the present invention for the reason described above.

Because the electrostatic attraction of a zeolite is caused by the exchanged cations of the zeolite, it is preferred that the number of the cations is large. In the cations of a zeolite, univalent charges can exist to an $AlO_2$ tetrahedron, so that a zeolite having a higher $AlO_2$ ratio per unit weight, that is, a zeolite having a smaller $SiO_2/Al_2O_3$ ratio, has more adsorption sites.

The crystalline zeolite X can have the $SiO_2/Al_2O_3$ molar ratio of less than 3. In particular, a high performance is obtained in the crystalline zeolite having the small $SiO_2/Al_2O3$ molar ratio of from 1.8 to 2.5.

For the reasons described above, the zeolite crystal of the adsorbent of the present invention is a crystalline zeolite X having large micropores in the crystal and the small $SiO_2/Al_2O_3$ molar ratio, that is, the crystalline zeolite X having the $SiO_2/Al_2O_3$ molar ratio of not larger than 3, and preferably from 1.8 to 2.5.

The ion-exchange ratio of the adsorbent of the present invention is explained below.

The ratio of the lithium cations in the adsorbent is such that the lithium cations associated with the $AlO_2$ tetrahedron units are from 80 to less than 88 mol %, and preferably from 85 to less than 88 mol %, of the total cations.

If the final lithium exchange ratio in the present invention is 88 mol % or higher, and in particular, 90 mol % or higher, the cost of the adsorbent becomes high due to the high cost of lithium, which is not preferred in the present invention. On the other hand, if the lithium exchange ratio is less than 80 mol %, a sufficient amount of the lithium cations cannot remain in the desired ion-exchange site III, which is also not preferred in the present invention.

The adsorbent of the present invention contains alkaline earth metal cations, and the content of the alkaline earth metal cations is from 0.5 to less than 4.6 mol %, and preferably from 2 to 4 mol %.

If the content of the alkaline earth metal cations is 4.6 mol % or higher, site III cannot retain 10 mol % or more of Li, an electrostatic field of the alkaline earth metal cations located at site I and site II is formed in the insides of the zeolite pores to increase the co-adsorption of oxygen, and the air separation characteristics are greatly decreased. The existing positions (sites) of cations are described hereafter in detail.

There is no particular limitation on the kind of the alkaline earth metal cation, but the calcium cation and the strontium cation are preferred.

The adsorbent of the present invention is one where the lithium cations located at the cation-exchange site III of the crystalline X-type zeolite are from 10 to less than 20 mol %.

It is known that the crystalline zeolite X has three ion-exchange sites (called site I, site II and site III). The positions of these sites of the crystalline zeolite X are shown in FIG. 1.

The cation located at the ion-exchange site forms an electrostatic field at the circumference thereof and adsorbs a polar substance. The lithium cations located at site III exist on the surface of the crystal in bare states and thus a strong electrostatic field can be formed. Therefore, site III is a favorable site for the nitrogen adsorption.

In conventional ion-exchange techniques, when the lithium cations are less than 80 mol % of the total cations, the lithium cations are all located at site I and site II, which are thermodynamically stable sites. Thus, in the conventional techniques, when the lithium exchange ratio is 80 mol % or lower, the nitrogen absorbing power is low, and when the lithium exchange ratio is 80 mol % or higher, the lithium cations are first located at site III for the first time, and the nitrogen adsorbing power is improved as the lithium exchange ratio increases.

In the adsorbent of the present invention, the lithium cation exchange ratio is low, but the same selective adsorbing power for nitrogen as in the case that the lithium cation exchange ratio is 90 mol % or higher can be obtained by increasing the amount of the effective lithium cations existing at the exchange site III of the crystalline zeolite X to 10 mol % or more.

On the other hand, cations which can exist at site III of the crystalline zeolite X are up to 20 mol % of the total cations, and it is impossible to locate more than 20 mol % of lithium cations at site III. The ratio of lithium cations in the crystalline zeolite can be correctly determined by a chemical analysis (ICP, etc.). The ratio of the lithium cations existing at the ion-exchange site III can be determined by an X-ray crystal structure analysis or a neutron diffraction analysis. More simply, it can be estimated from the adsorption characteristics of nitrogen.

In a lithium-exchanged crystalline zeolite X formed by a conventional ion-exchange method, when the lithium cation exchange ratio is 80 mol %, the lithium cations begin to be located at the exchange site III. Therefore, in the crystalline zeolite X having a lithium exchange ratio of 80 mol % or higher, the lithium cations located at the site III are in a proportional relationship with the nitrogen adsorbing power.

The relationships of the lithium exchange ratio of the crystalline zeolite X with the ratio of lithium existing at site III of the crystalline zeolite X and with the nitrogen adsorption characteristics (nitrogen adsorbed amount and the nitrogen separation coefficient) are shown in FIG. 2 to FIG. 5.

Because the lithium cations can exist at the site III up to 20 mol % at the maximum in the lithium-exchanged crystalline zeolite X, it is estimated that in the adsorbent having the same adsorption characteristics as the crystalline zeolite X having the lithium exchange ratio of 85 mol %, 5 mol % lithium cations exist at the site III and in the adsorbent having the same adsorption characteristics as the crystalline zeolite X having the lithium exchange ratio of 95 mol %, 15 mol % lithium cations exist at site III.

On the other hand, alkaline earth metal cations do not theoretically exist at site III, but even by the coexistence of these cations, the nitrogen adsorbed amount is also increased. However, when the nitrogen adsorbed amount is increased by the existence of the alkaline earth metal cations, the dispersion coefficient is inevitably decreased by the influence of the dispersion force. Thus, by always confirming both the nitrogen adsorbed amount and the separation coefficient, it is possible to separate the effect of the lithium cations at the site III from other factors.

The production method of the crystalline zeolite X adsorbent of the present invention is explained below.

The zeolite crystal which is used in the present invention is an crystalline zeolite X having a $SiO_2/Al_2O_3$ molar ratio of not larger than 3.0. However, there is no particular limitation on the production method of the crystalline zeolite X, and the crystalline zeolite X can be synthesized by a conventional method. For example, a production method of a crystalline zeolite X having a small $SiO_2/Al_2O_3$ molar ratio is disclosed in U.S. Pat. No. 2,882,244.

The adsorbent of the present invention may contain a binder, and a binder component may be converted into a zeolite (binderless). There is no particular limitation on the kind of the binder, and examples thereof include a silica binder, an alumina binder, an aluminum silicate binder, and a clay binder. Since a binder does not have an adsorbing power, it is preferred that the ratio of a binder below.

There are also no limitations on the size and the form of the adsorbent of the present invention. For example, there are a bead form and a pellet form, each having a diameter of from 1.0 to 2.0 mm.

It is preferred for producing the adsorbent of the present invention that the crystalline zeolite X is ion-exchanged with a lithium cation at 90 mol % or more to sufficiently exchange the ion-exchange site III of the crystalline zeolite X with the lithium cation. The ion-exchange ratio with the lithium cation in this step is at least 90 mol %, and preferably from 95 mol % to 100 mol %, of the total cations.

There is no particular limitation on the ion-exchange method, and there is, for example, a method of contacting the crystalline zeolite X with an aqueous solution of a lithium salt (e.g., an aqueous solution of lithium chloride) the pH of which is adjusted to from 10 to 11 with lithium hydroxide. The ion exchange may be a batch system or a flow continuous, but the ion exchange by a continuous is efficient. There is also no limitation on the temperature of the ion exchange. A higher temperature is more efficient and thus it is preferred to perform the ion exchange at a temperature of from 40° to 100° C., and more preferably at from 60° to 90° C.

In the present invention, from the crystalline zeolite X sufficiently ion-exchanged with the lithium cation, the lithium cations at the exchange site I and the exchange site II, which do not take part in the adsorption of nitrogen, are re-ion-exchanged with other cations.

In the ion exchange of the crystalline zeolite X with a lithium cation, a sodium cation is ion-exchanged with the lithium cation in order of the site I, site II, and site III, and the free energy of the reaction of introducing the lithium cation into each exchange site can be estimated from the equilibrium constant of the ion-exchange reaction.

The ion-exchange equilibrium constant (K) and the free energy change ($\Delta G$) of the ion exchange have the following relationship;

$$\Delta G = -RT \ln K$$

wherein R=gas constant ($8.3 \times 10^7$ erg/°K.·mol)
T=absolute temperature (°K.)

Figure 6:
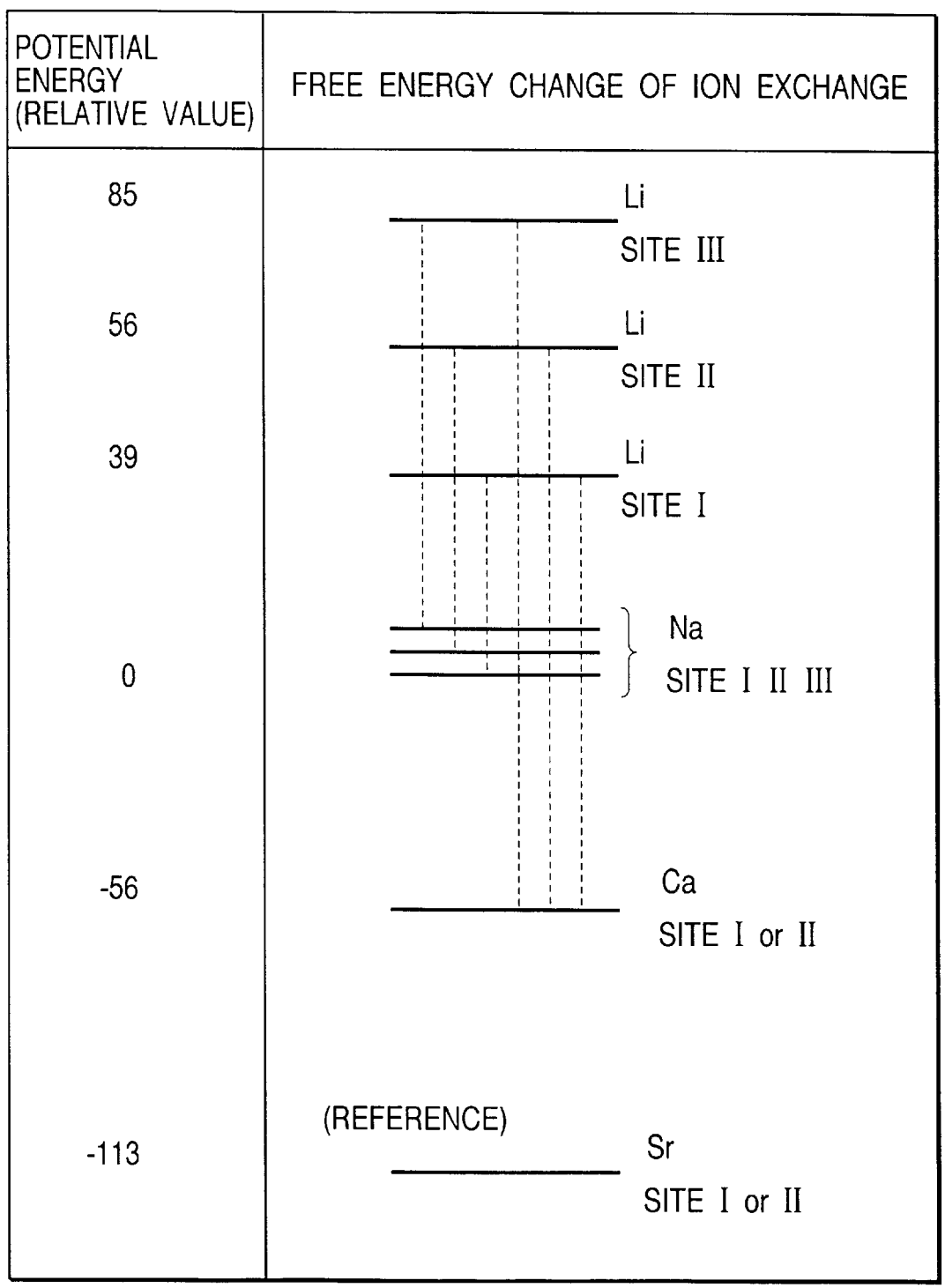
FIG. 6 is a view showing the order of the free energy of ion exchange.
Figure 7:
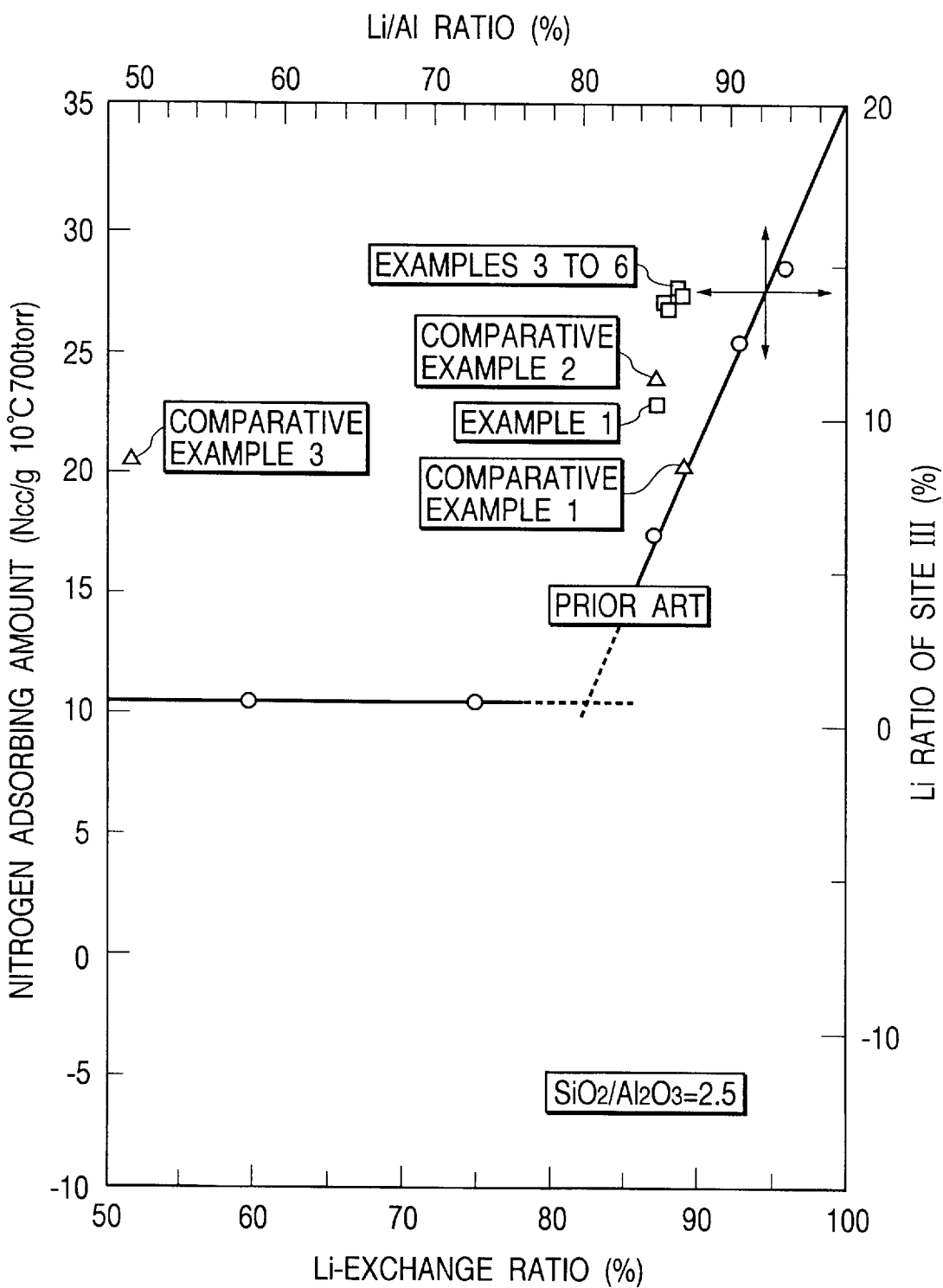
FIG. 7 is a graph showing the changes of the nitrogen adsorbing amount and the Li-exchange ratio of site III with the Li-exchange ratio in Examples 1 and 3 to 6 and Comparative Examples 1 to 3 when the $SiO_2/Al_2O_3$ ratio is 2.5.
Figure 8:
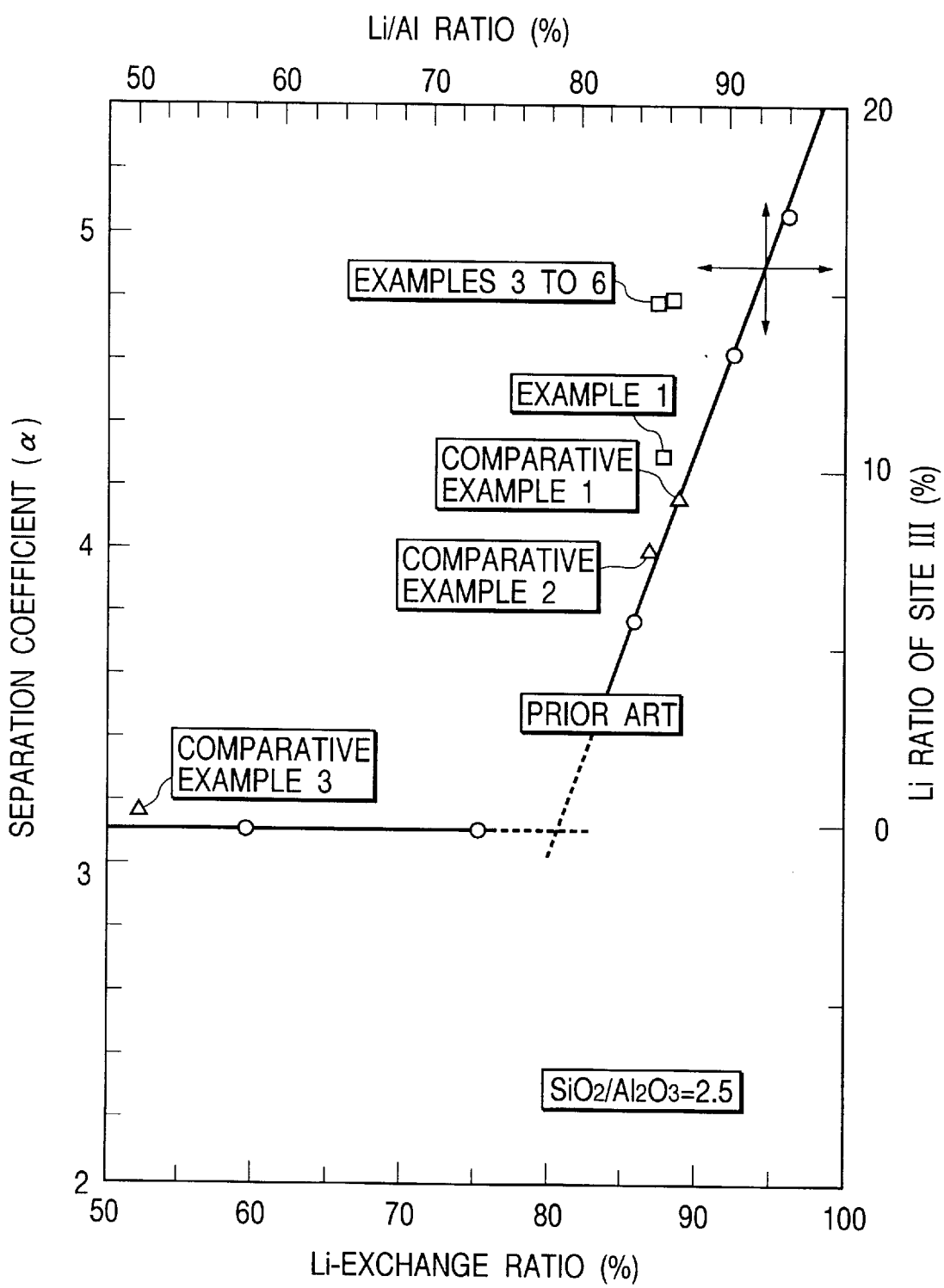
FIG. 8 is a graph showing the changes of the separation coefficient ($\alpha$) and the Li-exchange ratio of site III with the Li-exchange ratio in Examples 1 and 3 to 6 and Comparative Examples 1 to 3 when the $SiO_2/Al_2 O_3$ ratio is 2.0.
Figure 9:
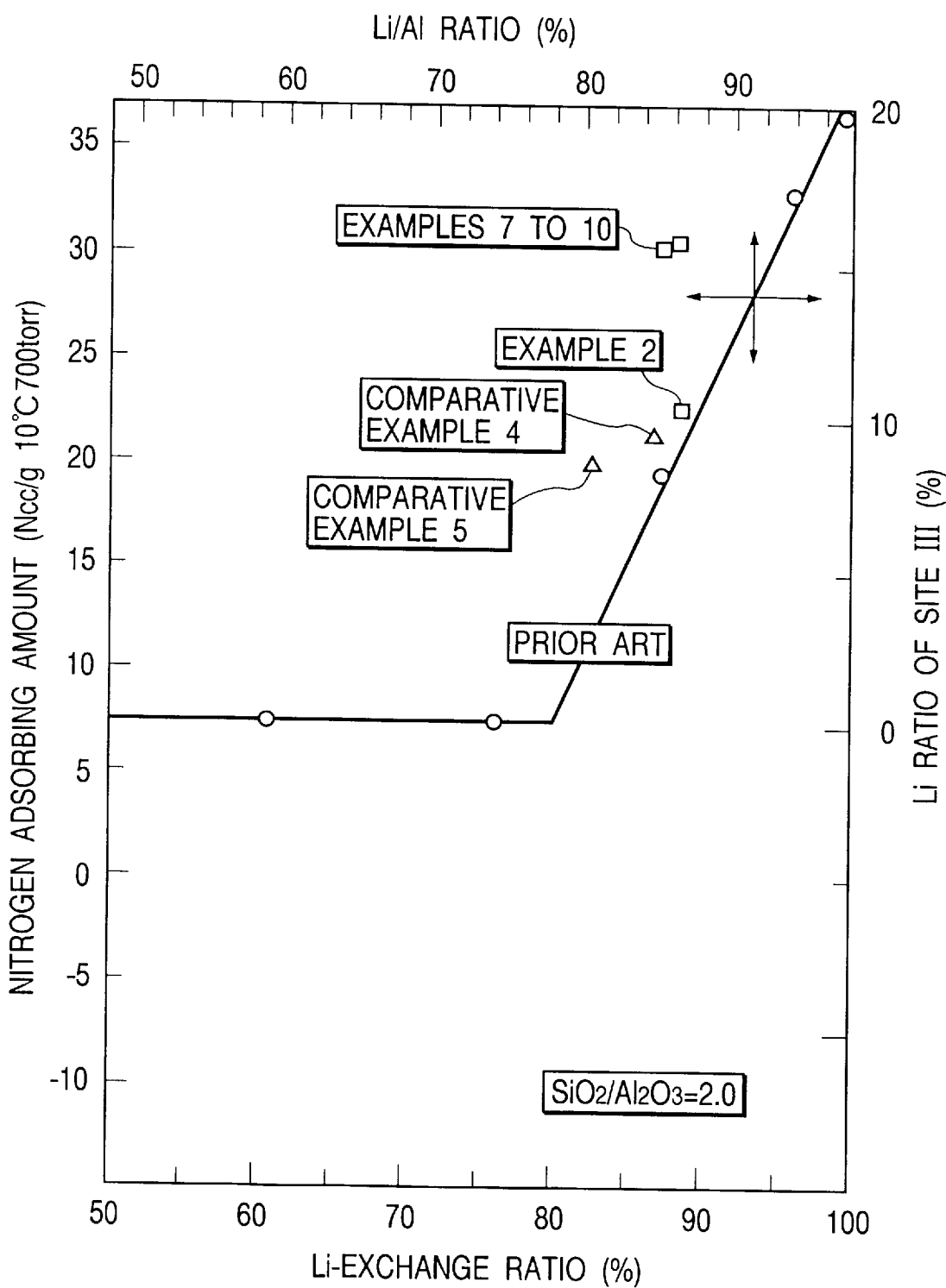
FIG. 9 is a graph showing the changes of the nitrogen adsorbing amount and the Li-exchange ratio of site III with the Li-exchange ratio in Examples 2 and 7 to 10 and Comparative Examples 4 and 5 when the $SiO_2/Al_2O_3$ ratio is 2.0.
Figure 10:
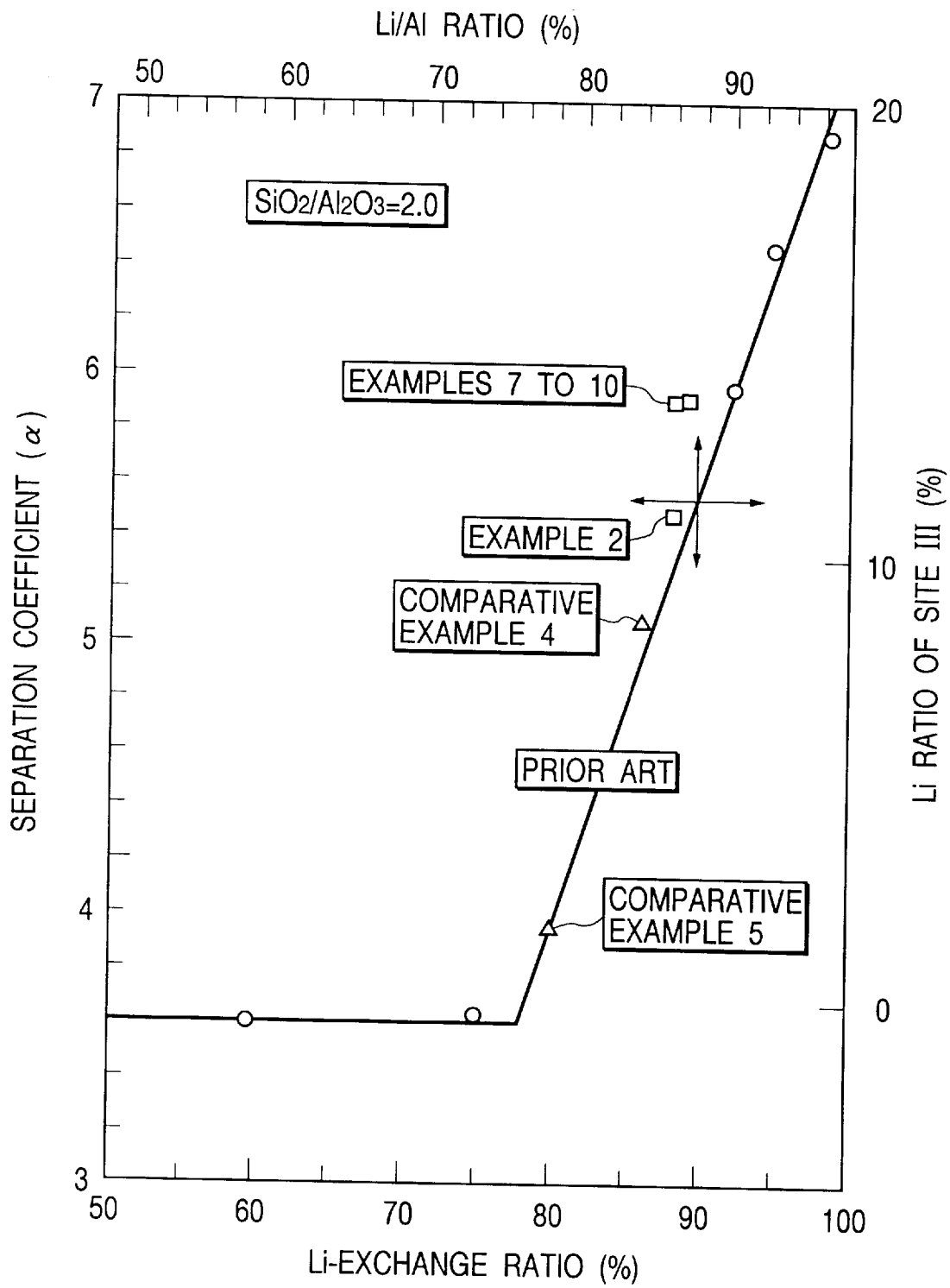
FIG. 10 is a graph showing the changes of the separation coefficient ($\alpha$) and the Li-exchange ratio of site III with the Li-exchange ratio in Examples 2 and 7 to 10 and Comparative Examples 4 and 5 when the $SiO_2/Al_2O_3$ ratio is 2.0.

A part of the order of the free energy of the cation-exchange site obtained from the ion-exchange equilibrium constant is shown in FIG. 6. Because the state of the sodium cation which is the raw material is the standard, the energy level of the sodium-type zeolite is defined to be 0.

It can be seen from FIG. 6 that the ΔG of ion exchanging from the sodium cation to an alkaline earth metal cation is a negative value and reaction is liable to proceed. On the other hand, the ΔG of the ion exchange from the sodium cation to the lithium cation is a positive value, and the reaction proceeds with difficulty. Further, the ΔG of the ion exchange becomes larger in the order of site I, site II, and site III, and the exchange is hard to perform in order of site III>the site II>site I.

In the present invention; from the crystalline zeolite X sufficiently ion-exchanged with the lithium cations, the lithium cations of the exchange site I and the exchange site II, which do not take part in the adsorption of nitrogen, are re-ion-exchanged with other cations. However, when the crystalline zeolite X which is ion-exchanged with the lithium cation is re-ion-exchanged with an ion-exchange solution of an alkali metal cation (e.g., a sodium cation) or an alkaline earth metal cation (e.g., a calcium cation), the lithium cation of the site III, which is the important cation for the nitrogen adsorption, is preferentially ion exchanged since the lithium cation of the site III has the largest negative ΔG.

The present inventors have found that in the re- exchange by a mixed ion-exchange solution of the sodium cation and the calcium cation, the ΔG of ion-exchanging the lithium cations of the site I and the site II with the calcium cations is larger than that of ion-exchanging the lithium cations of site III with the sodium cations. They have also found that lithium cations of site I and the site II can be removed by the re-ion-exchange with the mixed salt system of the sodium (alkali metal) cation and the calcium (alkaline earth metal) cation.

The values of ΔG in the case of ion-exchanging the lithium cation of each site with the sodium cation or the calcium cation are shown in Table 1 below.

TABLE 1

(Change of Ion-Exchange Free Energy)

| | Ion Exchange | ΔG (arb. unit) |
|---|---|---|
| (1) | Site I/Li → Sites I, II, III/Na | 39 |
| (2) | Site II/Li → Sites I, II, III/Na | 56 |
| (3) | Site III/Li → Sites I, II, III/Na | 85 |
| (4) | Site I/Li → Sites I, II/Ca | 95 |
| (5) | Site II/Li → Sites I, II/Ca | 112 |
| (6) | Site III/Li → Sites I, II/Ca | 141 |

As shown in Table 1 above, because the ΔG of the reactions (4) and (5) wherein the lithium cations of is sites I and II are ion-exchanged with the calcium cation is larger than the ΔG of the reaction of (3) wherein the lithium cation site III is ion-exchanged with the calcium cation, when the ion-exchange reaction with the lithium cation is competes with the sodium cation and the calcium cation, the lithium cations are removed from site I and site II.

In this case, however, because the ΔG of the reaction (6) is largest, the ion strength (concentration) of the calcium ions in the ion-exchange solution must be kept low.

The ion-exchange solution which is used for the re-ion-exchange in the present invention must contain both the alkali metal cation and the alkaline earth metal cation. In this case, there are no particular limitation on the kinds of the alkali metal cation and the alkaline earth metal cation. For example, a sodium cation can be used as the alkali metal cation, and a calcium cation or a strontium cation can be used as the alkaline earth metal cation.

On the other hand, the concentration of the alkaline earth metal cation is limited. The amount of the alkaline earth metal cation used must be from 0.5 to less than 4.6 mol %, and preferably from 2 to 4 mol %, of the total exchanged cations of the crystalline zeolite X after re-ion-exchanging the alkaline earth metal cations. This is because if the alkaline earth metal cations are 4.6 mol % or more of the total exchanged cations of the crystalline zeolite X, the co-adsorption of oxygen described above is greatly increased, whereby the selective adsorbing power of nitrogen is greatly decreased.

In the ion exchange of the present invention, the concentration of the ion-exchange solution used for the re-ion-exchange is 0.1 N or lower, and preferably 0.01 N or lower. If the ion strength of the re-ion-exchange solution is strong (i.e., the concentration is high), the reaction of removing the lithium cation of site III having a large ΔG undesirably tends to proceed.

The temperature for the re-ion-exchange is preferably low for the reason described above, and the re-ion-exchange is preferably carried out at 60° C. or lower. Conveniently, the re-ion-exchange may be practiced at room temperature (e.g., 25° C.).

It is preferred that the re-ion-exchange time is short. If the re-exchange time is long, the ion-exchange site shifts to an energetically stable state and the lithium cation of the site III is re-exchanged with site I and site II. The re-ion-exchange time is within 5 hours, and preferably within 2 hours.

The lithium recovered from site I and site II by the ion-exchange treatment of the adsorbent of the present invention is separated and recovered by an ion exchange, a chemical precipitation method, etc., and can be effectively reutilized. For the recovery and the reutilizing method of the lithium cation, various known methods can be applied and there is no particular limitation on the method.

After performing the ion exchanges described above, the adsorbent of the present invention is washed, dried, and heat-treated (activation) for use as the desired adsorbent.

There are no particular limitations on the conditions of washing, drying, and activation of the adsorbent.

However, for washing, for example, pure water or water the pH of which is adjusted to a weakly alkaline state with a slight amount of lithium hydroxide is used.

The drying is preferably carried out at low temperature, for example, at a temperature of from room temperature to 100° C., and preferably from 30° to 60° C.

The activation is a treatment of removing water adsorbed on the crystalline zeolite X by heating and it is preferred to carry out the activation in the state of a low steam partial pressure at low temperature. For example, a vacuum heat treatment at a temperature of from 300° to 600° C. in vacuo, a heat treatment with heated air of a low dew point, or an internal heating type heat treatment by supplying pure nitrogen or pure oxygen can be employed.

In the crystalline zeolite X adsorbent of the present invention, the lithium cations associated with an $AlO_2$ tetrahedron unit are less than 88 mol %, so that the adsorbent of the present invention is different from the adsorbent described above, wherein the lithium cations associated with an $AlO_2$ unit are 88 mol % or more (U.S. Pat. No. 4,859,217 and JP-B-5-25527). Also, the crystalline zeolite X adsorbent of the present invention has less co-adsorption of oxygen and is excellent in the selective adsorbing power of nitrogen since the alkaline earth metal cations are less than 4.6 mol %, and thus is utterly different from the conventional crystalline zeolite X adsorbent wherein the alkaline earth metal cations are 5 mol % or more (U.S. Pat. Nos. 5,174,979 and 5,152,813). Furthermore, the adsorbent of the present invention overlaps with the invention of U.S. Pat. No. 5,268,023 in the total exchange ratio of the lithium cations. However, in the method of U.S. Pat. No. 5,268,023, the lithium cations of site III can thermodynamically enter up to 8 mol % at most. Therefore, the adsorbent of the present invention wherein the lithium cations of site III are 10 mol % or more can be clearly distinguished from the adsorbent of U.S. Pat. No. 5,268,023.

The adsorbent of the present invention has an excellent selective adsorbing power for nitrogen, so that the adsorbent selectively adsorbs nitrogen from air and has a very excellent performance as the adsorbent which is used for a pressure swing adsorption method (PSA method) for obtaining an oxygen gas as a product.

There are no particular limitations on the operation conditions, etc., of the pressure swing adsorption method (PSA method) in the present invention so long as the adsorption method is an oxygen PSA method for obtaining oxygen gas as the product. A four column system, three column system, or two column system PSA method, a vacuum swing adsorption (hereinafter referred to as "VSA") method, a vacuum pressure swing adsorption (hereinafter referred to as "VPSA") method, etc., which exhibit a high performance regardless of the operation pressure range of the swing adsorption can be used.

The adsorbent of the present invention has a small content of lithium cations located at site I and site II, which are useless for the selective adsorption of nitrogen, and has a large content of the lithium cations located at site III, which have a high adsorbing power for nitrogen in a crystalline zeolite X. Therefore, the adsorbent of the present invention has an excellent cost performance as an adsorbent which is used to obtain an oxygen gas by a pressure swing adsorption method (PSA method).

The present invention is described in more detail by the following examples, but the invention is not limited to these examples.

EXAMPLES 1 AND 2

After ion-exchanging a crystalline zeolite X with a 1N calcium chloride aqueous solution, the crystalline zeolite X was re-ion-exchanged using a 1N lithium chloride aqueous solution (the pH thereof was adjusted to about 11 with lithium hydroxide) to make the ion exchanged ratio of lithium of the thus ion-exchanged crystalline zeolite X 87 mol % and that of calcium to 3%.

The ion-exchanged crystalline zeolite X was washed with pure water, dried overnight at 40° C., and activated in a vacuum state at 350° C. for one hour. The pressure at the activation was 5 torr or lower.

The $SiO_2Al_2O_3$ molar ratio (Si/Al$_2$), the Li/Al ratio, the cation exchange ratio, the nitrogen adsorbed amount ($Q_{N2}$) at 700 torr, and the separation coefficient ($\alpha$) of air at a nitrogen partial pressure of 700 torr of the crystalline zeolite as the mother zeolite are shown in Table 2 below.

TABLE 2

| | Ion-Exchange Ratio (mol %) | | | | | | (A) | $O_{N2}$ (B) | $\alpha$ |
|---|---|---|---|---|---|---|---|---|---|
| | Si/Al$_2$ | Li/Al | Li | Ca | Sr | Na | (%) | | |
| Example 1 | 2.5 | 86 | 87 | 3 | — | 10 | 9 ± 1 | 22.5 | 4.3 ± 0.1 |
| Example 2 | 2.0 | 86 | 87 | 3 | — | 10 | 9 ± 1 | 22.0 | 5.4 ± 0.1 |

(A): Lithium cation ratio at site III
(B): ($N_{cc}/g$) at 10° C.

It is known that because a proton ion or a hydronium ion partially exists in a zeolite, the ratio occupied by Li in the metal cations is different from the ratio of Li to aluminum. In order to avoid misunderstanding, both values are shown together in Table 2.

The ratio of the lithium cations located at site III was estimated from the nitrogen adsorbed amount or the separation coefficient. There was a good conformity between the lithium cation ratio of site III estimated from the nitrogen adsorbed amount and that of site III estimated from the separation coefficient.

The separation coefficient (relative volatility) of air at a nitrogen partial pressure of 700 torr was calculated from the following formula.

Separation coefficient ($\alpha$)=(a)/(b)×(c)/(d)

(a): Nitrogen adsorbed amount at 700 torr
(b): Oxygen adsorbed amount at 190 torr
(c): Oxygen concentration in air
(d): Nitrogen concentration in air

EXAMPLES 3 TO 10

After making the lithium exchange ratio of a crystalline zeolite 95 mol % using a 1N lithium chloride aqueous solution (the pH thereof was adjusted to about 11 with lithium hydroxide), the crystalline zeolite X was washed with pure water. The crystalline zeolite X was re-ion-exchanged with an aqueous solution of mixed chlorides of an alkaline earth metal (calcium or strontium) and an alkali metal (sodium) at a salt concentration of 0.01 N or lower at room temperature (25° C.) for one hour. The re-ion-exchanged crystalline zeolite X was washed with pure water, dried overnight at 40° C., and activated in a vacuum state at 350° C. for one hour. The pressure at the activation was 5 torr or lower.

The $SiO_2Al_2O_3$ molar ratio (Si/Al$_2$), the Li/Al ratio, the cation exchange ratio, the nitrogen adsorbed amount ($Q_{N2}$) at 700 torr, and the separation coefficient ($\alpha$) of air at a nitrogen partial pressure of 700 torr of the crystalline zeolite X as the mother zeolite are shown in Table 3 and Table 4 below.

TABLE 3

| | | Cation Exchange Ratio (mol %) | | | | | (A) | $O_{N2}$ | |
|---|---|---|---|---|---|---|---|---|---|
| | Si/Al$_2$ | Li/Al | Li | Ca | Sr | Na | (mol %) | (B) | $\alpha$ |
| Example 3 | 2.5 | 86 | 88 | 4 | — | 8 | 14 ± 1 | 26.5 | 4.8 ± 0.1 |
| Example 4 | 2.5 | 86 | 88 | — | 3 | 9 | 14 ± 1 | 27.0 | 4.8 ± 0.1 |
| Example 5 | 2.5 | 85 | 87 | 4 | — | 10 | 13 ± 1 | 26.0 | 4.8 ± 0.1 |
| Example 6 | 2.5 | 85 | 87 | — | 4 | 10 | 13 ± 1 | 27.0 | 4.8 ± 0.1 |

TABLE 3-continued

| | Si/Al$_2$ | Li/Al | Li | Ca | Sr | Na | (A) (mol %) | O$_{N2}$ (B) | α |
|---|---|---|---|---|---|---|---|---|---|
| Comparative Example 1 | 2.5 | 86 | 87 | — | — | 13 | 8 ± 1 | 19.0 | 4.1 ± 0.1 |
| Comparative Example 2 | 2.5 | 83 | 85 | 10 | — | 5 | 7 ± 1 | 23.0 | 3.9 ± 0.1 |
| Comparative Example 3 | 2.5 | 50 | 52 | 42 | — | 6 | 0 ± 1 | 21.0 | 3.1 ± 0.1 |

(A): Lithium cation ratio of site III
(B): (N$_{cc}$/g) at 10° C.

TABLE 4

| | Si/Al$_2$ | Li/Al | Li | Ca | Sr | Na | (A) (mol %) | O$_{N2}$ (B) | α |
|---|---|---|---|---|---|---|---|---|---|
| Example 7 | 2.0 | 86 | 87 | 4 | — | 8 | 15 ± 2 | 31.0 | 5.8 ± 0.1 |
| Example 8 | 2.0 | 86 | 87 | — | 3 | 9 | 15 ± 2 | 31.0 | 5.8 ± 0.1 |
| Example 9 | 2.0 | 86 | 87 | 4 | — | 10 | 15 ± 2 | 30.0 | 5.8 ± 0.1 |
| Example 10 | 2.0 | 86 | 87 | — | 4 | 10 | 15 ± 2 | 30.5 | 5.8 ± 0.1 |
| Comparative Example 4 | 2.0 | 85 | 84 | — | — | 13 | 8 ± 1 | 21.0 | 5.0 ± 0.1 |
| Comparative Example 5 | 2.0 | 80 | 80 | 15 | — | 5 | 3 ± 1 | 20.0 | 4.0 ± 0.1 |

(A) and (B) are the same as defined in Table 3.

COMPARATIVE EXAMPLES 1 TO 5

After making the lithium exchange ratio of a crystalline zeolite X 95 mol % using a 1N lithium chloride aqueous solution (the pH thereof was adjusted to about 11 with lithium hydroxide), the crystalline zeolite X was washed with pure water. The crystalline zeolite X was re-ion-exchanged with an aqueous salt solution of an alkali metal (sodium) alone (Comparative Examples 1 and 4) or an alkaline earth metal (calcium) alone (Comparative Examples 2 and 4) at a salt concentration of 0.01 N or lower at room temperature (25° C.).

Further, the crystalline zeolite X was re-ion-exchanged with an aqueous salt solution of an alkaline earth metal (calcium) alone (Comparative Example 3) of a salt concentration of 1N at room temperature for 2 hours.

Each re-ion-exchanged crystalline zeolite X was washed with pure water, dried overnight at 40° C., and activated in a vacuum state at 350° C. for one hour as in the Examples described above. The pressure at the activation was 5 torr or lower.

The results of the Comparative Examples are shown in Tables 3 and 4 above together with the results of the Examples.

When the alkaline earth cation was 4.5 mol % or higher, the nitrogen adsorbed amount was high, but only the crystalline zeolites each having a low separation coefficient were obtained.

When the ion exchange was performed with an alkali metal alone, the adsorbing power was the same as in the conventional techniques, and estimating from the separation coefficient, only the crystalline zeolites where the lithium cations at site III were less than 10 mol % were obtained.

FIGS. 7 to 10 show the relationship of the exchange ratio and the performance obtained by conventional ion-exchange techniques as mark o and also show the relationship of the exchange ratio and the performance of each of Examples 1 to 10 and each of Comparative examples 1 to 5 as □ and Δ, respectively.

From Tables 2 to 4 and FIGS. 7 to 10, it can be seen that a remarkable improvement of the performance was obtained in the methods of the present invention.

EXAMPLES 11 TO 14

Using each of the adsorbents prepared by forming granular moldings having a diameter of 1.5 mm composed of 90% by weight of a crystalline zeolite X and 10% by weight of a kaolin binder as the binder and ion-exchanging the granules such that the composition of each of the samples had each of the compositions of Examples 1, 2, 3, and 7, a practical PSA operation was carried out.

The PSA operation was carried out by a two-column system composed of two adsorption columns having a volume of 2 liters at an adsorption cycle of the adsorption of one minute, the desorption of 30 seconds, and a double pressure of 30 seconds. The pressure swing range was such that the average adsorption pressure was about 1,100 torr (nitrogen partial pressure about 900 torr) on the average, which is generally practiced at present as described in JP-A-8-71350, JP-A-8-71351, JP-A-8-239204 ("JP-A" as used herein means an "unexamined published Japanese patent application"), the desorption pressure was 250 torr, and the temperatures of the adsorption towers were 0° C. and 10° C.

The results obtained are shown in Table 5 and Table 6 below.

TABLE 5

[PSA Evaluation Results (Si/Al$_2$ = 2.5)]

| | Composition | Temperature (°C.) | Oxygen Amount (NL/kg-h) | Recovery (%) |
|---|---|---|---|---|
| Example 11 | Same as in Example 1 | 0 | 79.0 | 53.0 |
| | | 10 | 74.0 | 54.0 |
| Example 13 | Same as in Example 3 | 0 | 82.5 | 57.5 |
| | | 10 | 74.5 | 59.0 |
| Comparative Example 6 | Same as in Comparative Example 1 | 0 | 75.0 | 50.5 |
| | | 10 | 70.0 | 51.0 |
| Comparative Example 7 | Same as in Comparative Example 2 | 0 | 78.0 | 47.5 |
| | | 10 | 73.0 | 48.5 |
| Comparative Example 8 | Same as in Comparative Example 3 | 0 | 61.5 | 38.5 |
| | | 10 | 65.5 | 43.0 |

TABLE 6

[PSA Evaluation Results (Si/Al$_2$ = 2.0]

| | Composition | Temperature (°C.) | Oxygen Amount (NL/kg-h) | Recovery (%) |
|---|---|---|---|---|
| Example 12 | Same as in Example 2 | 0 | 103.0 | 58.0 |
| | | 10 | 92.0 | 57.5 |

TABLE 6-continued

[PSA Evaluation Results (Si/Al$_2$ = 2.0)]

|  | Composition | Temperature (°C.) | Oxygen Amount (NL/kg-h) | Recovery (%) |
|---|---|---|---|---|
| Example 14 | Same as in Example 7 | 0 | 107.0 | 65.5 |
|  |  | 10 | 96.5 | 64.0 |
| Comparative Example 9 | Same as in Comparative Example 4 | 0 | 100.0 | 54.0 |
|  |  | 10 | 91.0 | 53.5 |

As shown in the above Tables, the adsorbents of the present invention showed a high performance in practical PSA operation. In particular, in low temperature characteristics (0° C.) which are a problem in a practical plant, the adsorbents of the present invention maintained the high performance.

COMPARATIVE EXAMPLES 6 TO 9

Using each of the adsorbents obtained by ion-exchanging the granular moldings as in Examples 11 and 12 such that the compositions had each of the compositions in Comparative Examples 1 to 4, practical PSA operation was carried out.

The PSA operation was carried out using the same apparatus and under the same conditions as in Examples 9 and 10.

The results are shown in Table 5 and Table 6 above.

As shown by the above results, in the comparative adsorbents the performance was decreased as the temperature was low. In particular a severe decrease in the recovery affecting an electric power unit was observed.

EXAMPLES 15 TO 17

The granular molding as obtained in Example 11 was re-adjusted as that of Example 15 (Li=87.0 mol %, Ca=3.5 mol %, Na=9.5 mol %), that of Comparative Example 4 (Li=87.0 mol %, Na=13.0 mol %), and that of Comparative Example 5 (Li=87.0%, Ca=11.0 mol %, Na =2.0 mol %) each having the same lithium exchange ratio. Heat treatment, which was a general dehydration method for a zeolite adsorbent, was applied to each of the samples under a dry air stream at 600° C. for one hour. The temperature characteristics of each sample in the air separation characteristics was precisely evaluated. The sample of Example 16 (Li=87.0 mol %, Ca =4.5 mol %, Na=9.5 mol %) wherein the exchange ratio of the alkaline earth metal was near the upper limit and the sample of Example 17 (Li=87.0 mol %, Ca=2.0 mol %, Na=9.5 mol %) wherein the exchange ratio of the alkaline earth metal was near the lower limit were also evaluated together.

With the activation conditions of the present method, the dehydration state of the zeolite was good and the separation characteristics higher than the results of the vacuum activation in Examples 1 to 10.

Figure 11:
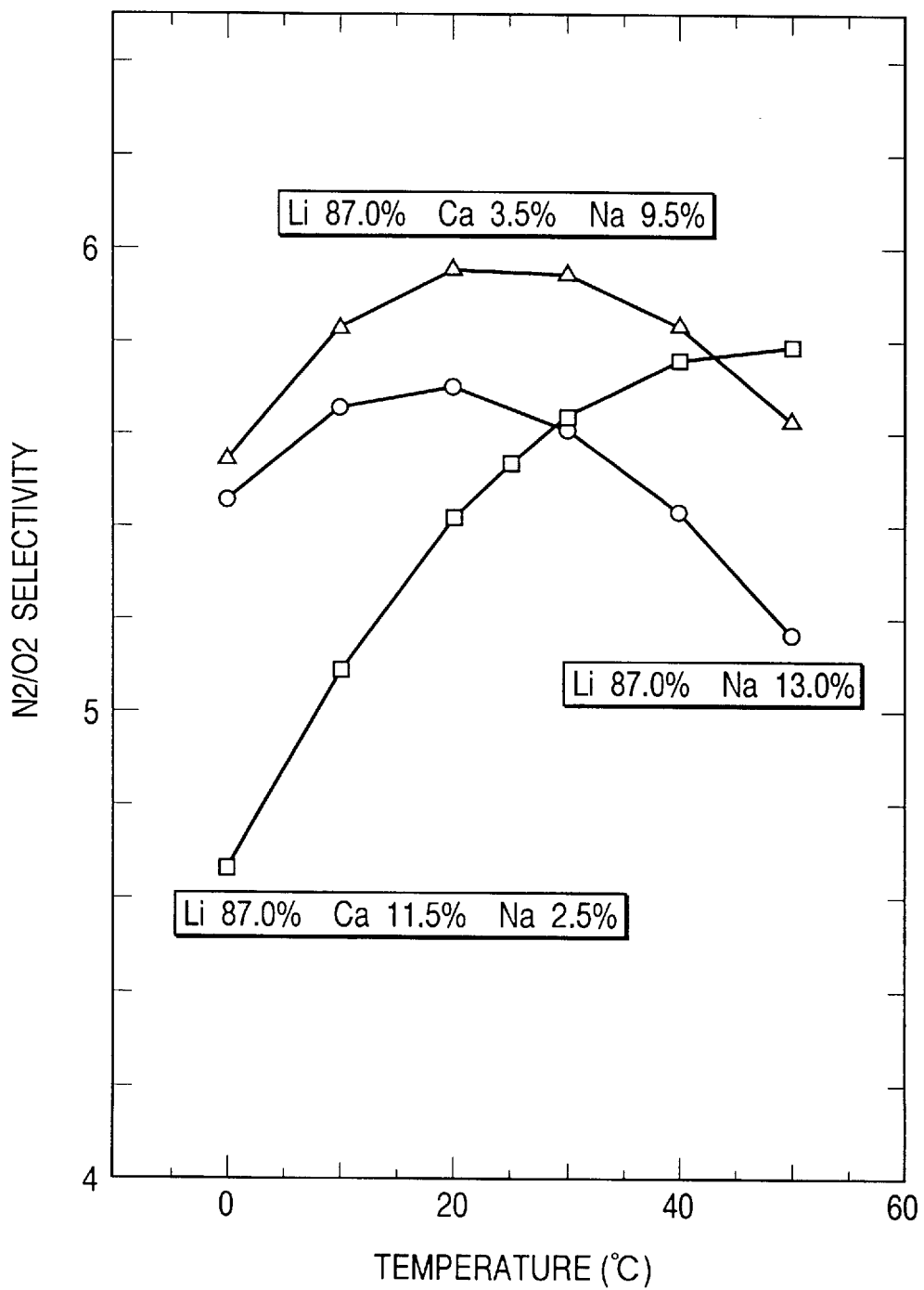
FIGS. 11 and 12 are graphs showing the changes of the separation coefficients of nitrogen and oxygen by temperature.
Figure 12:
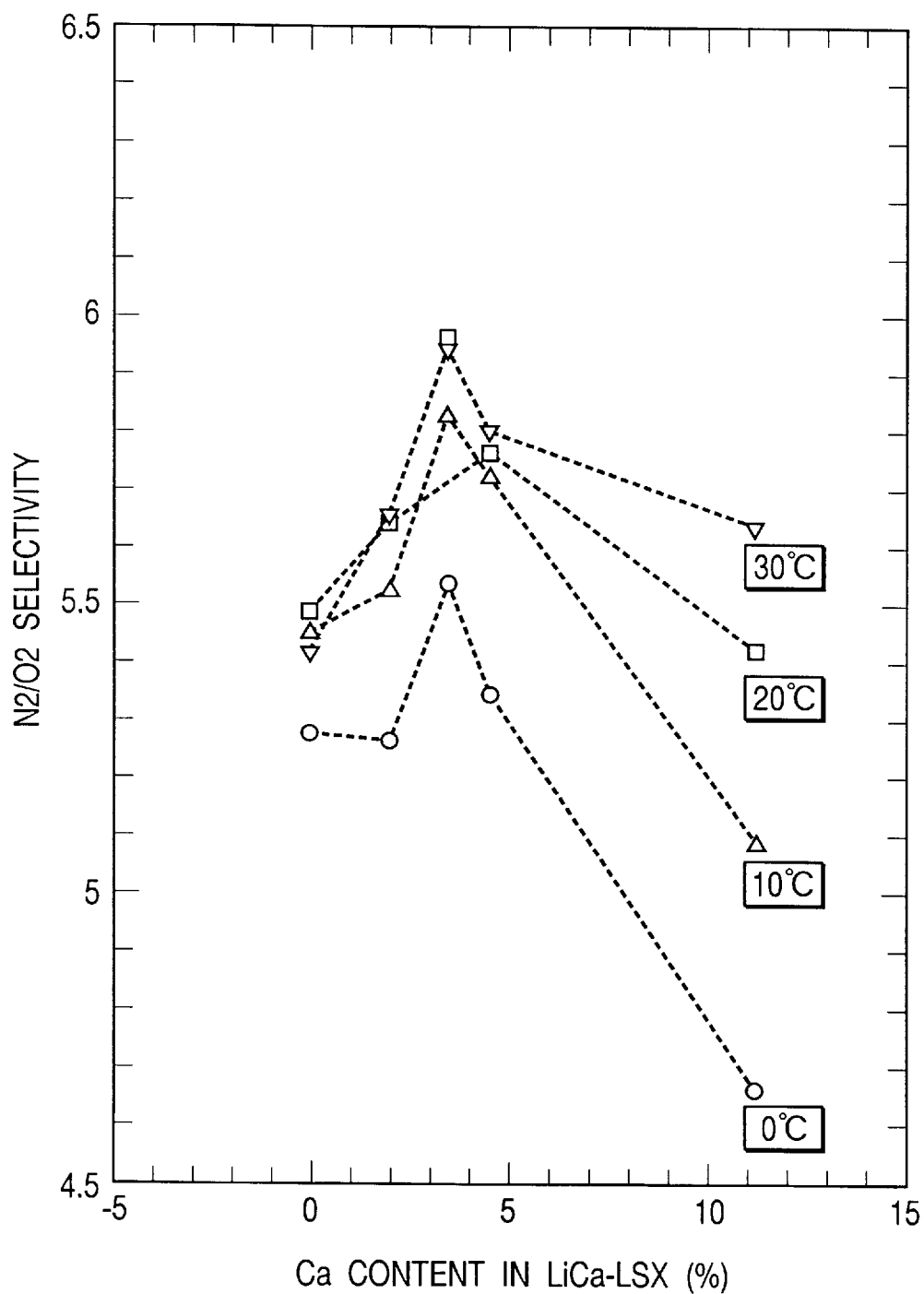

The change of the separation characteristics of nitrogen and oxygen by the Ca-exchange ratio is shown in FIG. 11 and the change of the separation characteristics of nitrogen and oxygen by temperature is shown in FIG. 12.

It can be seen from FIG. 11 that in the adsorbent of the present invention the separation characteristics from low temperature to high temperature are greatly improved even when the lithium exchange ratio is the same.

On the other hand, where the alkaline earth metal was contained in an amount larger than the range of the present invention, the separation coefficient may be improved at high temperature, but the separation coefficient is greatly lowered at low temperature. Thus, as a practical problem, when the temperature inside the adsorption towers is lowered, a large amount of the alkaline earth metal rather gives an adverse effect.

It can be seen from FIG. 12 that the effect of the present invention becomes maximum when the content of the alkaline earth metal is about 3 mol % and the effect is decreased starting from about 5 mol %.

Hitherto, it has been considered that the addition of the alkaline earth metal is preferably 5 mol % or higher, and more preferably 15 mol % or higher. It has been found in the present invention that a remarkable effect is obtained by the addition of the alkaline earth metal in a slight amount of less than 4.6 mol %.

As described above in detail, because the adsorbent of the present invention has a small content of expensive lithium and has a high adsorbing power of nitrogen, oxygen can be produced at low cost by a PSA method.

While the invention has been described in detail and with reference to specific embodiments thereof, it will be apparent to one skilled in the art that various changes and modifications can be made therein without departing from the spirit and scope thereof.

What is claimed is:

1. A crystalline zeolite X adsorbent comprising a crystalline zeolite X having a SiO$_2$/Al$_2$O$_3$ molar ratio of not larger than 3.0, wherein lithium cations associated with an AlO$_2$ tetrahedron unit are from 80 to less than 88 mol % of the total cations and content of alkaline earth metal cations is from 0.5 to less than 4.6 mol %.

2. The crystalline zeolite X adsorbent as claimed in claim 1, wherein the lithium cations located at the cation exchange site III of the crystalline zeolite X are from 10 to less than 20 mol % of the total cations.

3. An air separation method by a pressure swing adsorption, which comprises selectively adsorbing nitrogen in air to the crystalline zeolite X adsorbent as claimed in claim 1 to separate and recover oxygen in air.

4. A method of producing a crystalline zeolite X adsorbent, which comprises ion-exchanging with a lithium cation at least 90 mol % cations associated with an AlO$_2$ tetrahedron unit of a crystalline zeolite X having a SiO$_2$/Al$_2$O$_3$ molar ratio of not larger than 3.0, ion-exchanging again the crystalline zeolite X with an aqueous solution of a mixed salts of an alkali metal salt and an alkaline earth metal salt to decrease the lithium cations associated with the AlO$_2$ tetrahedron unit to 80 to less than 88 mol %, followed by washing and drying, and then activating the crystalline zeolite X.

5. The method of producing a crystalline zeolite X adsorbent as claimed in claim 4, wherein after ion-exchanging with the lithium cations, the crystalline zeolite X is re-ion-exchanged using an aqueous solution of mixed salts of an alkali metal salt and an alkaline earth metal salt of a concentration of 0.1N or lower at a temperature of 60° C. or lower within 5 hours.

* * * * *